United States Patent
Misawa

(10) Patent No.: US 10,916,970 B2
(45) Date of Patent: Feb. 9, 2021

(54) WIRELESS POWER TRANSFER SYSTEM, WIRELESS POWER TRANSMITTING DEVICE, AND WIRELESS POWER RECEIVING DEVICE

(71) Applicant: Toyota Jidosha Kabushiki Kaisha, Toyota (JP)

(72) Inventor: Takahiro Misawa, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 197 days.

(21) Appl. No.: 16/146,017

(22) Filed: Sep. 28, 2018

(65) Prior Publication Data

US 2019/0097463 A1  Mar. 28, 2019

(30) Foreign Application Priority Data

Sep. 28, 2017  (JP) .................. 2017-188660

(51) Int. Cl.
*H02J 50/12* (2016.01)
*H02J 7/02* (2016.01)
*H02J 50/80* (2016.01)
*B60L 53/12* (2019.01)

(52) U.S. Cl.
CPC .............. *H02J 50/12* (2016.02); *B60L 53/12* (2019.02); *H02J 7/025* (2013.01); *H02J 50/80* (2016.02)

(58) Field of Classification Search
CPC . B60L 53/12; H02J 50/12; H02J 50/80; H02J 7/00034; H02J 7/025
USPC ....................................................... 307/104
See application file for complete search history.

(56) References Cited

U.S. PATENT DOCUMENTS

| | | | |
|---|---|---|---|
| 7,741,734 B2 | 6/2010 | Joannopoulos et al. | |
| 2007/0222542 A1 | 9/2007 | Joannopoulos et al. | |
| 2008/0278264 A1 | 11/2008 | Karalis et al. | |
| 2009/0174264 A1* | 7/2009 | Onishi | H02J 50/90 307/104 |
| 2009/0174364 A1* | 7/2009 | Onishi | H02J 50/60 320/108 |

(Continued)

FOREIGN PATENT DOCUMENTS

| | | |
|---|---|---|
| AU | 2006269374 B2 | 10/2009 |
| AU | 2007349874 A2 | 1/2010 |

(Continued)

*Primary Examiner* — Daniel Kessie
*Assistant Examiner* — Brian K Baxter
(74) *Attorney, Agent, or Firm* — Dinsmore & Shohl LLP

(57) ABSTRACT

A wireless power transfer system includes a power transmitting device and a power receiving device. When an abnormality occurs in the power transmitting device during power transmission to the power receiving device, the power transmitting devise stops power transmission. When power transmission is stopped, the power receiving device transitions to a sleep state which requires less power consumption than an operating state. When a first sleep time has elapsed since the transition to the sleep state, the power receiving device automatically starts up and sends the power transmitting device a request for resuming power transmission. When power transmission is stopped due to an abnormality in the power transmitting device, the power transmitting device resumes power transmission in response to receiving from the power receiving device a request for resuming power transmission as a trigger.

5 Claims, 8 Drawing Sheets

(56) References Cited

U.S. PATENT DOCUMENTS

| | | |
|---|---|---|
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0026236 A1* | 2/2010 | Kamiyama ............. H02J 50/80 320/108 |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2010/0311327 A1* | 12/2010 | Hamada ............... H02J 7/025 455/41.1 |
| 2013/0127409 A1 | 5/2013 | Ichikawa |
| 2013/0193749 A1 | 8/2013 | Nakamura et al. |
| 2013/0342161 A1* | 12/2013 | Byun ................. H02J 50/10 320/108 |
| 2014/0062395 A1* | 3/2014 | Kwon .................. H02J 5/005 320/108 |
| 2014/0139035 A1* | 5/2014 | Ishihara ................ H02J 7/025 307/104 |
| 2014/0247052 A1* | 9/2014 | Hada ..................... H02J 50/12 324/426 |
| 2014/0333131 A1* | 11/2014 | Maruhashi ............ H02J 7/025 307/11 |
| 2015/0091386 A1* | 4/2015 | Nagamine ............. H02J 5/005 307/104 |
| 2016/0197494 A1* | 7/2016 | Kwon .................... H02J 5/005 307/104 |
| 2017/0018977 A1* | 1/2017 | Van Wageningen .... H02J 50/12 |
| 2017/0324279 A1* | 11/2017 | Kang ..................... H02J 7/025 |
| 2018/0262049 A1* | 9/2018 | Ikefuji .................. H02J 7/025 |
| 2019/0260240 A1* | 8/2019 | Kwon .................. H04B 5/0037 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2010-119246 A | 5/2010 |
| JP | 2013-110822 A | 6/2013 |
| JP | 2013-126327 A | 6/2013 |
| JP | 2013-146148 A | 7/2013 |
| JP | 2013146154 A | 7/2013 |
| JP | 2013154815 A | 8/2013 |
| JP | 2013-223397 A | 10/2013 |
| KR | 20080031398 A | 4/2008 |
| KR | 20100015954 A | 2/2010 |
| WO | 2007008646 A2 | 1/2007 |
| WO | 2008118178 A1 | 10/2008 |
| WO | 2010/055381 A1 | 5/2010 |
| WO | 2013108108 A2 | 7/2013 |

* cited by examiner

WIRELESS POWER TRANSFER SYSTEM, WIRELESS POWER TRANSMITTING DEVICE, AND WIRELESS POWER RECEIVING DEVICE

CROSS REFERENCE TO RELATED APPLICATIONS

This nonprovisional application claims priority to Japanese Patent Application No. 2017-1888660 filed on Sep. 28, 2017 with the Japan Patent Office, the entire contents of which are hereby incorporated by reference.

BACKGROUND

Field

The present disclosure relates to a technology for wirelessly transferring power from a power transmitting device to a power receiving device.

Description of the Background Art

Japanese Patent Laying-Open No. 2010-119246 discloses a power transfer system including a power transmitting device connected to a grid power supply, and a power receiving device for wirelessly receiving power from the power transmitting device. When the efficiency of power transfer from the power transmitting device to the power receiving device is less than a prescribed value, this power transfer system temporarily stops power transmission, periodically transmits low power, and checks the efficiency. When the efficiency recovers to more than or equal to the prescribed value, the power transfer system resumes power transmission.

SUMMARY

In the power transfer system disclosed in Japanese Patent Laying-Open No. 2010-119246, it is desirable that power transmission be stopped when an abnormality occurs in the power transmitting device, and it is desirable that power transmission be resumed when the abnormality in the power transmitting device is removed while power transmission is stopped. When the determination of whether to resume power transmission is preformed by the power transmitting device, however, the power receiving device needs to wait in an operating state all the time to be ready for the resumption of power transmission. This may lead to wasteful increase in power consumption of the power receiving device.

In particular, while power transmission is stopped, the power transmitting device, which is connected to a grid power supply, can operate using power from the grid power supply; whereas the power receiving device, which is not connected to a grid power supply, will operate using power in an auxiliary battery in the power receiving device. Accordingly, the power receiving device waiting in an operating state all the time while power transmission is stopped would wastefully increase in power consumption, thus involving the risk of rundown of the auxiliary battery in the power receiving device.

The present disclosure has been made in order to solve such a problem. An object of the present disclosure is, in a wireless power transfer system for wirelessly transferring power from a power transmitting device to a power receiving device, when the power transmitting device stops power transmission due to an abnormality in the power transmitting device, to resume power transmission while reducing power consumption of the power receiving device.

(1) A wireless power transfer system according to the present disclosure includes: a power transmitting device configured to wirelessly transmit power; and a power receiving device configured to wirelessly receive power from the power transmitting device and communicate with the power transmitting device. The power transmitting device is configured to, when an abnormality occurs in the power transmitting device during power transmission to the power receiving device, stop power transmission to the power receiving device. The power receiving device is configured to: when the power transmission is stopped due to an abnormality in the power transmitting device, transition to a sleep state; and when a first time has elapsed since the transition to the sleep state, send the power transmitting device a request for resuming power transmission. The power transmitting device is configured to, when receiving the request for resuming power transmission while the power transmission is stopped, resume the power transmission.

According to the above configuration, when power transmission is stopped due to an abnormality in the power transmitting device, the power transmitting device resumes power transmission in response to receiving from the power receiving device a request for resuming power transmission as a trigger, not in response to removal of the abnormality as a trigger. For a period of time from the stop of power transmission to the sending of a request for resuming power transmission to the power transmitting device (first time), the power receiving device is in a sleep state instead of waiting in an operating state, the sleep state requiring less power consumption than the operating state. Thus, when the power transmitting device stops power transmission due to an abnormality in the power transmitting device, power transmission can be resumed while the power receiving device consumes less power.

(2) In one embodiment, the power transmitting device is configured to, when an abnormality occurs in the power transmitting device during power transmission to the power receiving device, stop the power transmission and notify the power receiving device of a type of abnormality in the power transmitting device. The power receiving device is configured to, when the power transmission is stopped due to an abnormality in the power transmitting device, set the first time in accordance with the type of abnormality notified from the power transmitting device before transitioning to the sleep state.

According to the above configuration, a period of time from the stop of power transmission to the resumption of power transmission (first time) can be varied in accordance with the type of abnormality in the power transmitting device. For example, when the abnormality in the power transmitting device is an overcurrent or an overvoltage, such an abnormality would be removed in a relatively short time. In this case, therefore, setting the first time to a relatively short time would enable early resumption of power transmission. When the abnormality in the power transmitting device is a temperature abnormality, it would take a certain amount of time to lower the temperature and remove the abnormality. In this, case, therefore, setting the first time to a relatively long time would be able to prevent power transmission from being immediately stopped again after the resumption of power transmission.

(3) In one embodiment, the power transmitting device is configured to, when receiving from the power receiving device a request for stopping power transmission during power transmission to the power receiving device, stop the power transmission. The power receiving device is configured to: when an abnormality occurs in the power receiving device during power reception from the power transmitting device, send the power transmitting device the request for stopping power transmission and then transition to the sleep state; and when a second time has elapsed since the transition to the sleep state, send the power transmitting device the request for resuming power transmission.

According to the above configuration, when the power transmitting device stops power transmission in response to receiving from the power receiving device a request for stopping power transmission (in response to the occurrence of an abnormality in the power receiving device), the power transmitting device resumes power transmission in response to receiving from the power receiving device a request for resuming power transmission as a trigger. For a period of time from the sending of a request for stopping power transmission to the sending of a request for resuming power transmission to the power transmitting device (second time), the power receiving device is in a sleep state instead of waiting in an operating state. Thus, when the power transmitting device stops power transmission due to an abnormality in the power receiving device, too, power transmission can be resumed while the power receiving device consumes less power.

(4) In one embodiment, the power receiving device is configured to, when an abnormality occurs in the power receiving device during power reception from the power transmitting device, set the second time in accordance with a type of abnormality in the power receiving device before transitioning to the sleep state.

According to the above configuration, a period of time from the stop of power transmission to the resumption of power transmission (second time) can be varied in accordance with the type of abnormality in the power receiving device.

(5) A wireless power transmitting device according to the present disclosure is configured to wirelessly transmit power to a power receiving device. The power transmitting device includes: a communication device configured to communicate with the power receiving device; and a controller configured to control power transmission to the power receiving device. The controller is configured to: when an abnormality occurs in the power transmitting device during power transmission to the power receiving device, stop power transmission to the power receiving device; and when receiving from the power receiving device a request for resuming power transmission while the power transmission is stopped, resume the power transmission.

According to the above configuration, when power transmission is stopped due to an abnormality in the power transmitting device, the power transmitting device resumes power transmission in response to receiving from the power receiving device a request for resuming power transmission as a trigger, not in response to removal of the abnormality as a trigger. Thus, for a period of time from the stop of power transmission to the sending of a request for resuming power transmission to the power transmitting device, the power receiving device does not need to wait in an operating state but can be in a sleep state which requires less power consumption than the operating state. Thus, when the power transmitting device stops power transmission due to an abnormality in the power transmitting device, power transmission can be resumed while the power receiving device consumes less power.

(6) A wireless power receiving device according to the present disclosure is configured to wirelessly receive power from a power transmitting device. The power receiving device includes: a communication device configured to communicate with the power transmitting device; and a controller configured to control the communication device. The controller is configured to: when power transmission from the power transmitting device is stopped due to an abnormality in the power transmitting device, transition to a sleep state where the communication with the power transmitting device is stopped; and when a first time has elapsed since the transition to the sleep state, send the power transmitting device a request for resuming power transmission.

According to the above configuration, when power transmission is stopped due to an abnormality in the power transmitting device, the power receiving device is in a sleep state instead of waiting in an operating state, the sleep state requiring less power consumption than the operating state. When the first time has elapsed since the transition to the sleep state, the power receiving device sends the power transmitting device a request for resuming power transmission. Accordingly, the power transmitting device can resume power transmission in response to receiving from the power receiving device a request for resuming power transmission as a trigger, not in response to removal of the abnormality in the power transmitting device as a trigger. Thus, when the power transmitting device stops power transmission due to an abnormality in the power transmitting device, power transmission can be resumed while the power receiving device consumes less power.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Embodiments of the present disclosure will now be described hereinafter in detail with reference to the drawings. In the figures, identical or corresponding components are identically denoted and will not be described repeatedly.

Embodiment 1

<Configuration of Power Transfer System>

Figure 1:
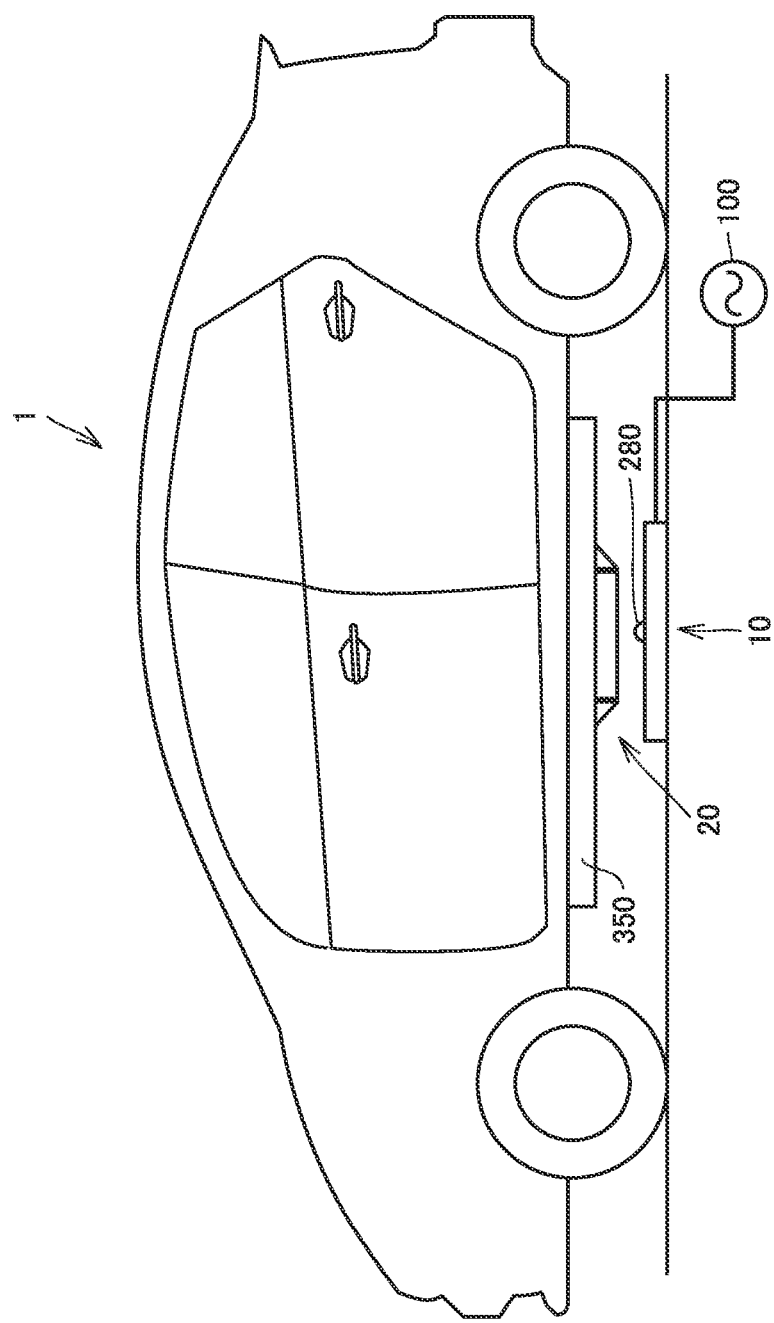
FIG. 1 generally shows a power transfer system.

FIG. 1 generally shows a power transfer system in this embodiment. The power transfer system comprises a vehicle 1 and a power transmitting device 10. Vehicle 1 includes a power receiving device 20. Power receiving device 20 is provided on a bottom surface of vehicle 1 and is provided, for example, on a lower surface (a road facing side) of a power storage device 350 installed on a bottom surface of vehicle 1.

Power transmitting device 10 receives power supplied from an alternate current (AC) power supply 100 (for example, a commercial grid power supply). Power transmitting device 10 is installed on the ground and configured to wirelessly transmit power to power receiving device 20 of vehicle 1 via a magnetic field in a state in which vehicle 1 is aligned such that power receiving device 20 faces power transmitting device 10.

Furthermore, power transmitting device 10 includes a camera 280. Camera 280 is equipped with a fisheye lens and is provided substantially at the center of the upper surface of power transmitting device 10. Camera 280 provided with the fisheye lens is configured to capture a largo space including power receiving device 20 when vehicle 1 moves toward power transmitting device 10.

Camera 280 is a sensor for sensing a foreign body disposed between power transmitting device 10 and power receiving device 20, and for aligning power transmitting device 10 with power receiving device 20. The "foreign body" refers to a body that should not be present between power transmitting device 10 and power receiving device 20. Examples of conceivable foreign bodies include a piece of metal, such as a beverage can and a coin, and an animal. Further, "sensing a foreign body" may include sensing an alien body around power transmitting device 10, as well as sensing a foreign body disposed between power transmitting device 10 and power receiving device 20.

Figure 2:
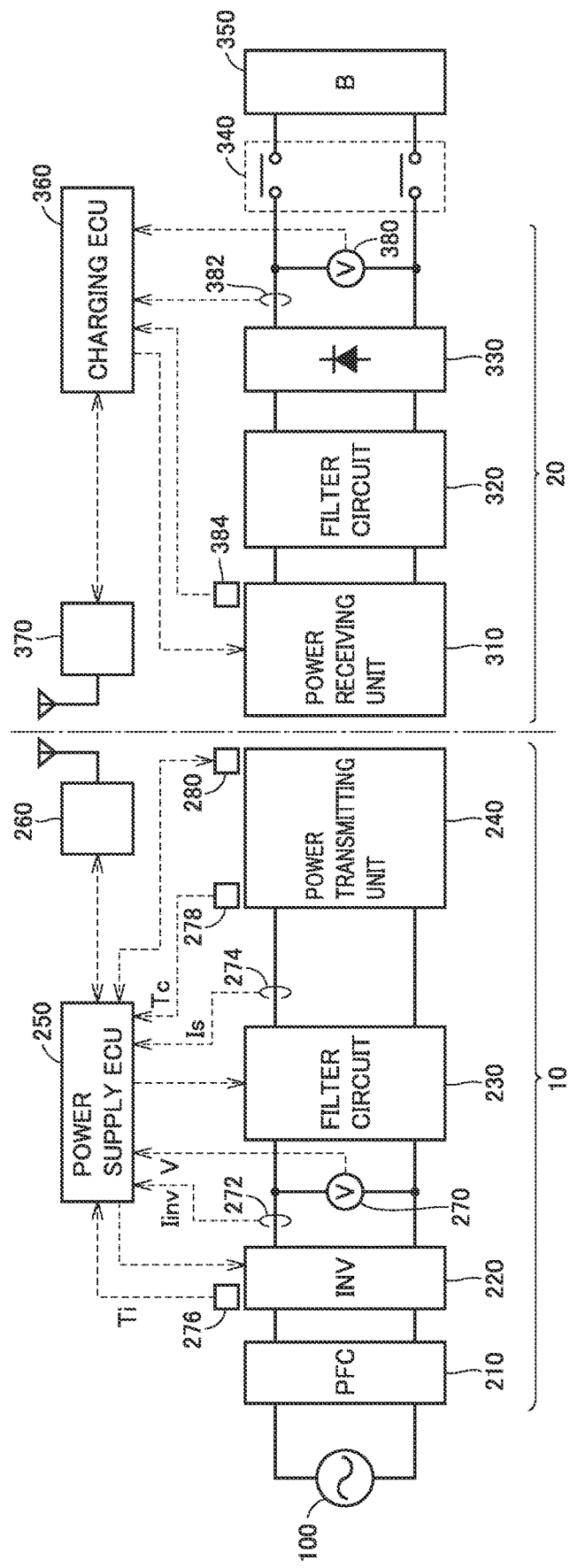
FIG. 2 is a block diagram of the power transfer system.
Figure 3:
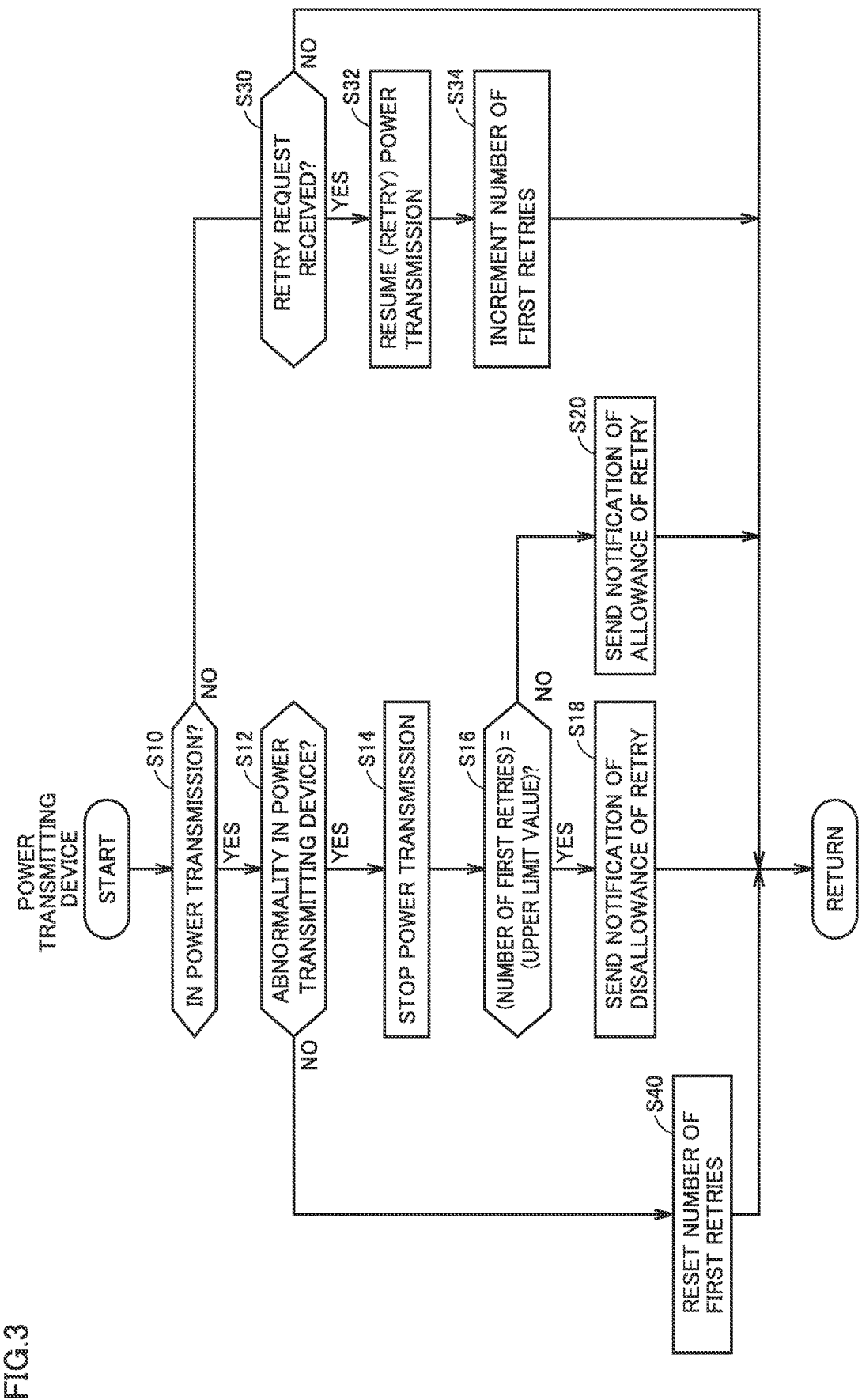
FIG. 3 is a flowchart (Part 1) showing an example procedure of a power supply ECU of a power transmitting device.

FIG. 2 is a block diagram of the power transfer system shown in FIG. 1. Power transmitting device 10 includes a power factor correction (PFC) circuit 210, an inverter 220, a filter circuit 230, and a power transmitting unit 240. Furthermore, power transmitting device 10 further includes a power supply electronic control unit (ECU) 230, a communication unit 260, a voltage sensor 270, current sensors 272 and 274, temperature sensors 276 and 278, and camera 280 (FIG. 3).

PFC circuit 210 receives power from AC power supply 100, rectifies and increases the power in voltage, and supplies the power to inverter 220, and also brings an input current close to a sinusoidal wave to correct a power factor. PFC circuit 210 can be a variety of types of known PFC circuits. Note that in place of PFC circuit 210, a rectifier which does not have a power factor correcting function may be used.

Inverter 220 is controlled by power supply ECU 250, and receives direct-current (DC) power from PFC circuit 210 and converts the received DC power to (AC) power having a prescribed frequency (for example of several tens of kHz) to be transmitted. Inverter 220 can adjust a frequency of power to be transmitted (hereinafter also referred to as a "power transmission frequency") with a prescribed resolution by changing a switching frequency in accordance with a control signal received from power supply ECU 250. Inverter 220 is composed for example of a single-phase full bridge circuit.

Filter circuit 230 is provided between inverter 220 and power transmitting unit 240 and can suppress harmonic noise generated from inverter 220. Filter circuit 230 is composed of an LC filter including an inductor and a capacitor.

Power transmitting unit 240 receives from inverter 220 through filter circuit 230 AC power (or power to be transmitted) generated by inverter 220, and wirelessly transmits the power to power receiving unit 310 of power receiving device 20 through a magnetic field generated around power transmitting unit 240. Power transmitting unit 240 includes a resonance circuit for wirelessly transmitting power to power receiving unit 310. While the resonance circuit can be composed of a coil and a capacitor, the resonance circuit may dispense with the capacitor when the coil can alone form a desired resonant state.

Voltage sensor 270 senses a voltage V output from inverter 220 and outputs the sensed value to power supply ECU 250. Current sensor 272 senses a current flowing through inverter 220, that is, a current Iinv output from inverter 220, and outputs the sensed value to power supply ECU 250. It should be noted that based on the sensed values of voltage sensor 270 and current sensor 272, the power supplied from inverter 220 to power transmitting unit 240 to be transmitted can be sensed. Current sensor 274 senses a current Is flowing through power transmitting unit 240 and outputs the sensed value to power supply ECU 250.

Temperature sensor 276 senses a temperature Ti of inverter 220 and outputs the sensed value to power supply ECU 250. Temperature sensor 278 senses a temperature Tc of power transmitting unit 240 and outputs the sensed value to power supply ECU 250.

Communication unit 260 is configured to wirelessly communicate with communication unit 370 of power receiving device 20. When power transmitting device 10 transmits power to power receiving device 20, communication unit 260 receives control information of power receiving device 20 transmitted by power receiving device 20 (such as a resonance frequency of power receiving unit 310) and transmits control information of power transmitting device 10 (such as a power transmission frequency) to power receiving device 20.

Power supply ECU 250 includes a central processing unit (CPU), a read only memory (ROM) for storing a processing program or the like, a random access memory (RAM) for temporarily storing data, an input/output port for inputting/outputting various signals, etc., none of which is shown, and receives a signal from each above sensor, etc., and executes control of various devices in power transmitting device 10. Note that each type of control is not necessarily processed by software, and can also be processed by dedicated hardware (or electronic circuitry).

Next, power receiving device 20 is described. Power receiving device 20 includes a power receiving unit 310, a filter circuit 320, a rectifying unit 330, a charging relay 340, and a power storage device 350. Furthermore, power receiving device 20 further includes a charging ECU 360, a communication unit 370, a voltage sensor 380, a current sensor 382, and a temperature sensor 384.

Power receiving unit 319 wirelessly receives, through a magnetic field, the (AC) power output and thus transmitted from power transmitting unit 240 of power transmitting device 10. Power receiving unit 310, for example, includes a resonance circuit (not shown) for wirelessly receiving power from power transmitting unit 240. The resonance circuit of power receiving unit 310 is composed of a coil and a capacitor.

Filter circuit 320 is provided between power receiving unit 310 and rectifying unit 330, and suppresses harmonic noise generated when power receiving unit 310 receives power. Filter circuit 320 is composed for example of an LC filter including an inductor and a capacitor. Rectifying unit 330 rectifies AC power received by power receiving unit 310 and outputs the rectified power to power storage device 350. Rectifying unit 330 includes a smoothing capacitor together with a rectifier.

Power storage device 350 is a rechargeable direct current (DC) power supply, and includes a lithium-ion or nickel metal hydride battery or a similar secondary battery. Power storage device 350 stores power output from rectifying unit 330. Then, power storage device 350 supplies the stored power to a vehicle driving device (an inverter and a driving motor, etc.) (not shown). Note that an electric double layer capacitor or the like can also be adopted as power storage device 350.

Charging relay 340 is provided between rectifying unit 330 and power storage device 350. Charging relay 340 is brought into conduction (or turned on) when power transmitting device 10 charges power storage device 350.

Voltage sensor 380 senses a voltage output from rectifying unit 330 (or received power's voltage) and outputs the sensed value to charging ECU 360. Current sensor 382 senses a current output from rectifying unit 330 (or received power's current) and outputs the sensed value to charging ECU 360. Based on the sensed values of voltage sensor 380 and current sensor 382, power received by power receiving unit 310 (which corresponds to charging power for power storage device 350) can be sensed. Voltage sensor 380 and current sensor 382 may be provided between power receiving unit 310 and rectifying unit 330 (for example, between filter circuit 320 and rectifying unit 330).

Temperature sensor 384 senses a temperature of power receiving unit 310 and outputs the sensed value to charging ECU 360.

Charging ECU 360 includes a CPU, a ROM, a RAM, an input/output port, and the like, none of which is shown, and receives a signal from each above sensor and the like and also controls various types of devices in power receiving device 20. Each type of control is not necessarily processed by software, and can also be processed by dedicated hardware (or electronic circuitry).

While power is received from power transmitting device 10, charging ECU 360 generates a target of power in power transmitting device 10 to be transmitted (a target power) so that power receiving device 20 receives power of a desired target. Then, charging ECU 360 transmits the generated target of power to be transmitted (or the target power) to power transmitting device 10 by communication unit 370.

Communication unit 370 is configured to wirelessly communicate with communication unit 260 of power transmitting device 10. When power transmitting device 10 transmits power to power receiving device 20, communication unit 370 receives control information transmitted from power transmitting device 10 (such as a power transmission frequency) and transmits control information of power receiving device 20 (such as a resonance frequency of power receiving unit 310) to power transmitting device 10. Furthermore, as described above, communication unit 370 receives data (a position detection result) indicative of a relative positional relationship between power transmitting device 10 and power receiving device 20 from charging ECU 360 and transmits the data to power transmitting device 10.

In this power transfer system, in power transmitting device 10, AC power to be transmitted is supplied from inverter 220 through filter circuit 230 to power transmitting unit 240. When the AC power to be transmitted is supplied to power transmitting unit 240, energy (or power) moves from power transmitting unit 240 to power receiving unit 310 through a magnetic field formed between a power transmitting coil of power transmitting unit 240 and a power receiving coil of power receiving unit 310. The energy (or power) moved to power receiving unit 310 is supplied to power storage device 350 through filter circuit 320 and rectifying unit 330.

<Determination of Abnormality in Power Transmitting Device>

During power transmission from power transmitting device 10 to power receiving device 20, power supply ECU 250 of power transmitting device 10 executes an "abnormality determination process" for determining the presence or absence of an abnormality in power transmitting device 10. The types of abnormality to be determined by the abnormality determination process include an overvoltage abnormality, an overcurrent abnormality, an overheating abnormality, and a foreign body abnormality.

Power supply ECU 250 determines the presence of an overvoltage abnormality when voltage V sensed by voltage sensor 270 exceeds an acceptable value, for example.

Power supply ECU 250 determines the presence of an overcurrent abnormality when current Iinv sensed by current sensor 272 exceeds an acceptable value or when current Is sensed by current sensor 274 exceeds an acceptable value, for example.

Power supply ECU 250 determines the presence of an overheating abnormality when temperature Ti sensed by temperature sensor 276 exceeds an acceptable value or when temperature Tc sensed by temperature sensor 278 exceeds an acceptable value, for example.

Power supply ECU 250 determines the presence of a foreign body abnormality when a foreign body is sensed by camera 280, for example.

<Stop of Power Transmission Due to Abnormality in Power Transmitting Device and Resumption of Power Transmission>

In a power transfer system having the configuration as described above, it is desirable that power transmission be stopped when the above-described abnormality determination process determines the presence of abnormality in power transmitting device 10 during power transmission from power transmitting device 10 to power receiving device 20, and it is desirable that power transmission be resumed when the abnormality in power transmitting device 10 is removed while power transmission is stopped.

When the determination of whether to resume power transmission is preformed by power transmitting device 10, however, charging ECU 360 of power receiving device 20 needs to wait in an operating state all the time to be ready for the resumption of power transmission. This may lead to wasteful increase in power consumption of charging ECU 360.

In particular, while power transmission is stopped, power transmitting device 10, which is connected to AC power supply 100, can operate using power from AC power supply 100; whereas since power receiving device 20 is not connected to AC power supply 100, charging ECU 360 will operate using power in an auxiliary battery (not shown) in power receiving device 20. Accordingly, charging ECU 360 waiting in an operating state all the time while power transmission is stopped would wastefully increase in power consumption, thus involving the risk of rundown of the auxiliary battery in power receiving device 20.

In view of this, in a power transfer system in this embodiment, when power transmission is stopped due to the occurrence of an abnormality in power transmitting device 10, power supply ECU 250 of power transmitting device 10 resumes power transmission in response to receiving a retry request (a request for resuming power transmission) from power receiving device 20 as a trigger, not in response to removal of the abnormality as a trigger. Charging ECU 360 of power receiving device 20 is configured to, when power transmission from power transmitting device 10 is stopped, transition to a sleep state instead of waiting in an operating state, for a period of time from the stop of power transmission to the sending of a retry request (a first sleep time described later). Thus, when power transmitting device 10 stops power transmission due to an abnormality in power transmitting device 10, power transmission can be resumed while charging ECU 360 of power receiving device 20 consumes less power.

Note that the "sleep state" of charging ECU 360 refers to a state in which charging ECU 360 can perform only a timer process for counting the time elapsed since the stop of power transmission and cannot perform other processes (e.g. wirelessly communicating with power transmitting device 10 through communication unit 370, and charging power storage device 350). On the other hand, the "operating state" of charging ECU 360 refers to a state in which charging ECU 360 can perform the timer process and other processes described above. When charging ECU 360 is in the sleep state, the power consumption of charging ECU 360 (the power consumption of the entire power receiving device 20) is less than that in an operating state.

FIG. 3 is a flowchart showing an example procedure which power supply ECU 250 of power transmitting device 10 executes when power transmission is stopped due to an abnormality in power transmitting device 10 and is then resumed. This flowchart is executed repeatedly 11 for example, wireless communication between power transmitting device 10 and power receiving device 20 is established.

Power supply ECU 250 determines whether or not power transmission to power receiving device 20 is being performed (Step S10).

When power transmission is being performed (YES at Step S10), power supply ECU 250 determines whether or not an abnormality (any of an overvoltage abnormality, an overcurrent abnormality, an overheating abnormality, and a foreign body abnormality) has occurred in power transmitting device 10 based on the result of the above-described abnormality determination process (Step S12).

When an abnormality has not occurred in power transmitting device 10 (NO at Step S12), power supply ECU 250 resets the number of first retries (Step S40). The number of first retries refers to the number of times power transmission is stopped due to an abnormality in power transmitting device 10 and is then resumed (retried).

When an abnormality has occurred in power transmitting device 10 (YES at Step S12), power supply ECU 250 stops power transmission to power receiving device 20 (Step S14).

After stopping power transmission, power supply ECU 250 determines whether or not the number of first retries has reached an upper limit value (Step S16). The upper limit value of the number of first retries may be a predetermined fixed value.

Alternatively, the upper limit value of the number of first retries may be a value variable in accordance with the type of abnormality in power transmitting device 10. In this case, in order to prevent the charging time from lasting extremely long when an overheating abnormality is present, the upper limit value for overheating abnormality may be set to a value smaller than the upper limit values for the other abnormalities. Also, considering that, for determining the presence of overvoltage abnormality or overcharge abnormality, the abnormality should desirably be detected a plurality of times, the upper limit value for overvoltage abnormality or overcharge abnormality may be set to a value larger than the upper limit value for overheating abnormality. Further, in order to reduce the risk of erroneously determining the presence of foreign body abnormality, the upper limit value for foreign body abnormality may be set to a value larger than the upper limit values for the other abnormalities.

When the number of first retries has reached an upper limit value (YES at Step S16), power supply ECU 250 sends a notification of disallowance of retry to power receiving device 20 (Step S18).

When the number of first retries has not reached an upper limit value (NO at Step S16), power supply ECU 250 sends a notification of allowance of retry to power receiving device 20 (Step S20). This notification of allowance of retry also includes information indicating the type of abnormality (an overvoltage abnormality, an overcurrent abnormality, an overheating abnormality, or a foreign body abnormality) in power transmitting device 10.

When power transmission is not being performed (NO at Step S10), power supply ECU 250 determines whether or not a retry request has been received from power receiving device 20 (Step S30). When a retry request has not been received (NO at Step S30), power supply ECU 250 skips the subsequent steps and goes on to the return.

When a retry request has been received (YES at Step S30), power supply ECU 250 resumes (retries) power transmission (Step S32). After that, power supply ECU 250 increments the number of first retries by one (Step S34).

Figure 4:
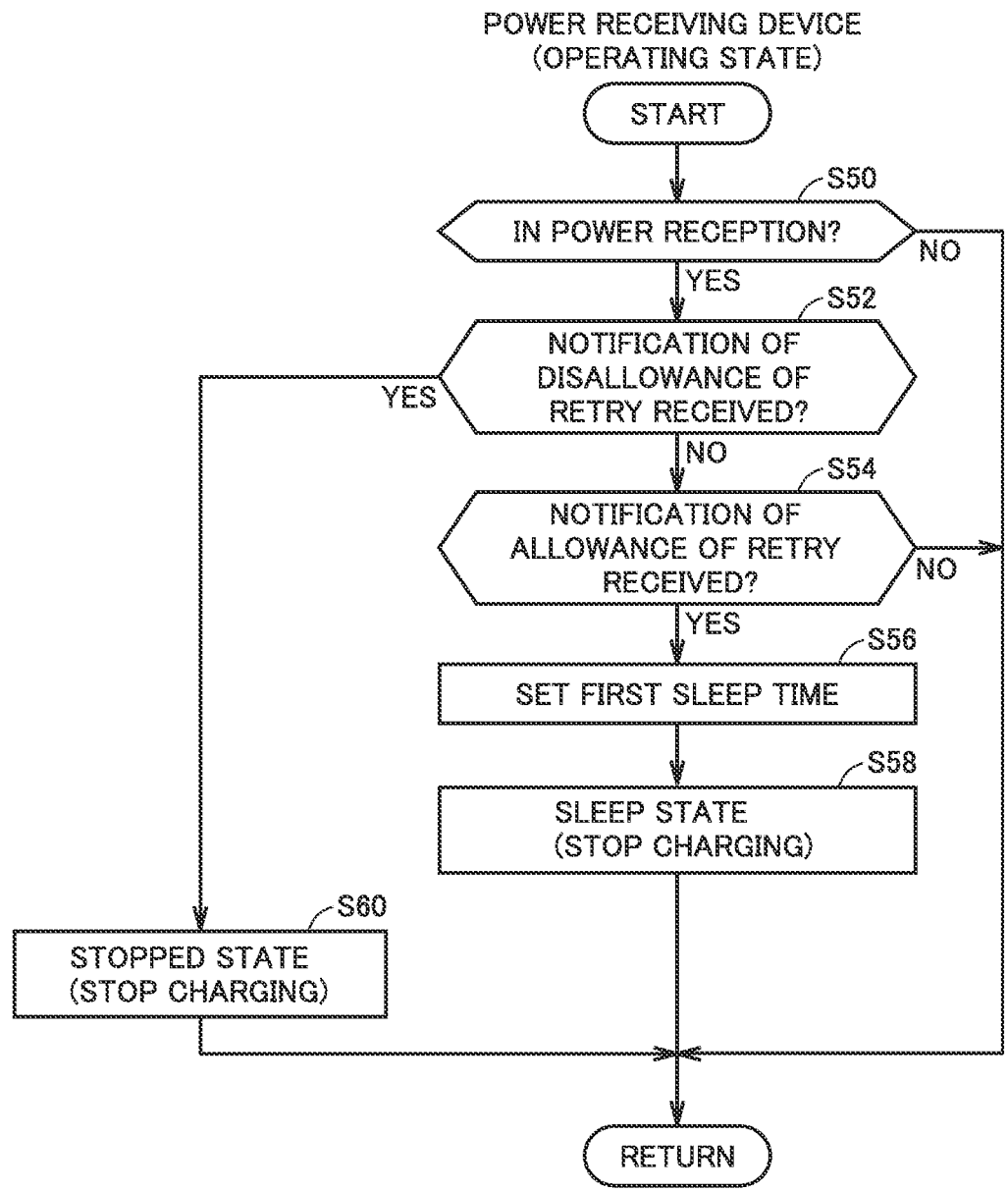
FIG. 4 is a flowchart (Part 1) showing an example procedure to be executed when a charging ECU of a power receiving device is in an operating state.

FIG. 4 is a flowchart showing an example procedure which charging ECU 360 of power receiving device 20 executes when it is in an operating state. This flowchart is executed repeatedly if, for example, wireless communication between power transmitting device 10 and power receiving device 20 is established.

Power receiving device 20 determines whether or not power reception from power transmitting device 10 is being performed (Step S50). When power reception is not being performed (NO at Step S50), charging ECU 360 skips the subsequent steps and goes on to the return.

When power reception is being performed (YES at Step S50), charging ECU 360 determines whether or not a notification of disallowance of retry has been received from power transmitting device 10 (Step S52).

When a notification of disallowance of retry has been received (YES at Step S52), charging ECU 360 stops charging and transitions to a stopped state (Step S60).

When a notification of disallowance of retry has not been received (NO at Step S52), charging ECU 360 determines whether or not a notification of allowance of retry has been received from power transmitting device 10 (Step S54). When a notification of allowance of retry has not been received (NO at Step S54), charging ECU 360 skips the subsequent steps and goes on to the return.

When a notification of allowance of retry has been received (YES at Step S54), charging ECU 360 sets a first sleep time in accordance with the type of abnormality (an overvoltage abnormality, an overcurrent abnormality, an overheating abnormality, or a foreign body abnormality) in power transmitting device 10 included in the notification of allowance of retry (Step S56).

Considering that an overcurrent abnormality and an overvoltage abnormality can be removed in a relatively short time, charging ECU 360 sets the first sleep time for overcurrent abnormality and overvoltage abnormality to a shorter time than for the other abnormalities, for example. Further, considering that it takes a certain amount of time to remove an overheating abnormality (to lower the temperature), charging ECU 360 sets the first sleep time for overheating abnormality to a longer time than for the other abnormalities, for example.

After setting the first sleep time, charging ECU 360 transitions to a sleep state (Step S58).

Figure 5:
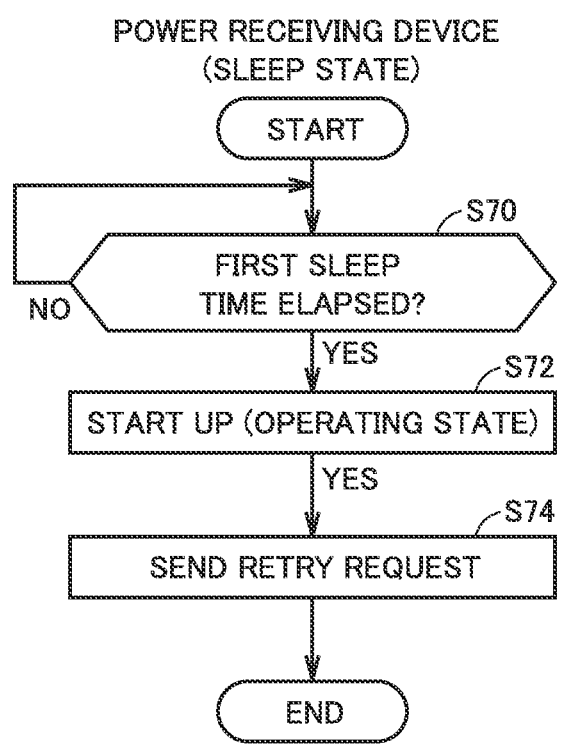
FIG. 5 is a flowchart (Part 1) showing an example procedure to be executed when the charging ECU of the power receiving device transitions to a sleep state.

FIG. 5 is a flowchart showing an example procedure which charging ECU 360 of power receiving device 20 executes when it transitions to a sleep state.

Charging ECU 360 determines whether or not the first sleep time has elapsed since the transition to a sleep state (Step S70).

When the first sleep time has not elapsed (NO at Step S70), charging ECU 360 returns the process to Step S70, and maintains the sleep state until the first sleep time has elapsed.

When the first sleep time has elapsed (YES at Step S70), charging ECU 360 starts up and returns from the sleep state to the operating state (Step S72). Charging ECU 360 then sends a retry request to power transmitting device 10 (Step S74).

As described above, when power supply ECU 250 of power transmitting device 10 in this embodiment stops power transmission due to an abnormality in power transmitting device 10, power supply ECU 250 resumes power transmission in response to receiving from power receiving device 20 a request for resuming power transmission as a trigger, not in response to removal of the abnormality as a trigger. For a period of time from the stop of power transmission to the sending of a request for resuming power transmission to power transmitting device 10 (first sleep time), charging ECU 360 of power receiving device 20 in this embodiment is in a sleep state instead of waiting in an operating state, the sleep state requiring less power consumption than the operating state. Thus, when power transmitting device 10 stops power transmission due to an abnormality in power transmitting device 10, power transmission can be resumed while power receiving device 20 (charging ECU 360) consumes less power.

In particular, when power transmission is stopped due to an abnormality in power transmitting device 10, charging ECU 360 of power receiving device 20 in this embodiment sets a first sleep time in accordance with the type of abnormality in power transmitting device 10 notified from power transmitting device 10 before transitioning to a sleep state. Specifically, considering that an overcurrent abnormality and an overvoltage abnormality can be removed in a relatively short time, charging ECU 360 sets the first sleep time for overcurrent abnormality and overvoltage abnormality to a shorter time than for the other abnormalities. Thus, at the time of occurrence of overcurrent abnormality or overvoltage abnormality which can be removed in a relatively short time, power transmission can be resumed at an early stage. Further, considering that it takes a certain amount of time to remove an overheating abnormality (to lower the temperature), charging ECU 360 sets the first sleep time for overheating abnormality to a longer time than for the other abnormalities. Thus, after the resumption of power transmission, power transmission can be prevented from being immediately stopped again by a recurrent overheating abnormality.

Embodiment 2

The above Embodiment 1 describes the stop of power transmission due to an abnormality in power transmitting device 10 and the resumption of power transmission. Embodiment 2 describes the stop of power transmission due to an abnormality in power receiving device 20 and the resumption of power transmission, in addition to the description of Embodiment 1.

<Determination of Abnormality in Power Receiving Device>

Charging ECU 360 of power receiving device 20 in Embodiment 2 determines the presence or absence of an abnormality in power receiving device 20 during power reception from power transmitting device 10. The types of abnormality in power receiving device 20 include an overvoltage abnormality, an overcurrent abnormality, and an overheating abnormality.

Charging ECU 360 determines the presence of an overvoltage abnormality in power receiving device 20 when a voltage sensed by voltage sensor 380 exceeds an acceptable value, for example.

Charging ECU 360 determines the presence of an overcurrent abnormality in power receiving device 20 when a current sensed by current sensor 382 exceeds an acceptable value, for example.

Charging ECU 360 determines the presence of an overheating abnormality in power receiving device 20 when a temperature sensed by temperature sensor 384 exceeds an acceptable value, for example.

<Stop of Power Transmission Due to Abnormality in Power Receiving Device and Resumption of Power Transmission>

When an abnormality occurs in power receiving device 20, charging ECU 360 of power receiving device 20 in Embodiment 2 sends power transmitting device 10 a request for stopping power transmission.

When power supply ECU 250 of power transmitting device 10 in Embodiment 2 receives from power receiving device 20 a request for stopping power transmission, it stops power transmission to power receiving device 20. When power supply ECU 250 stops power transmission in response to receiving from power receiving device 20 a request for stopping power transmission, power supply ECU 250 resumes power transmission in response to receiving from power receiving device 20 a request for resuming power transmission as a trigger.

For a period of time from the sending of a request for stopping power transmission to the sending of a retry request to power transmitting device 10 (second sleep time), charging ECU 360 is in a sleep state instead of waiting in an operating state. Thus, when power transmitting device 10 stops power transmission due to an abnormality in power receiving device 20, too, power transmission can be resumed while power receiving device 20 consumes less power.

Figure 6:
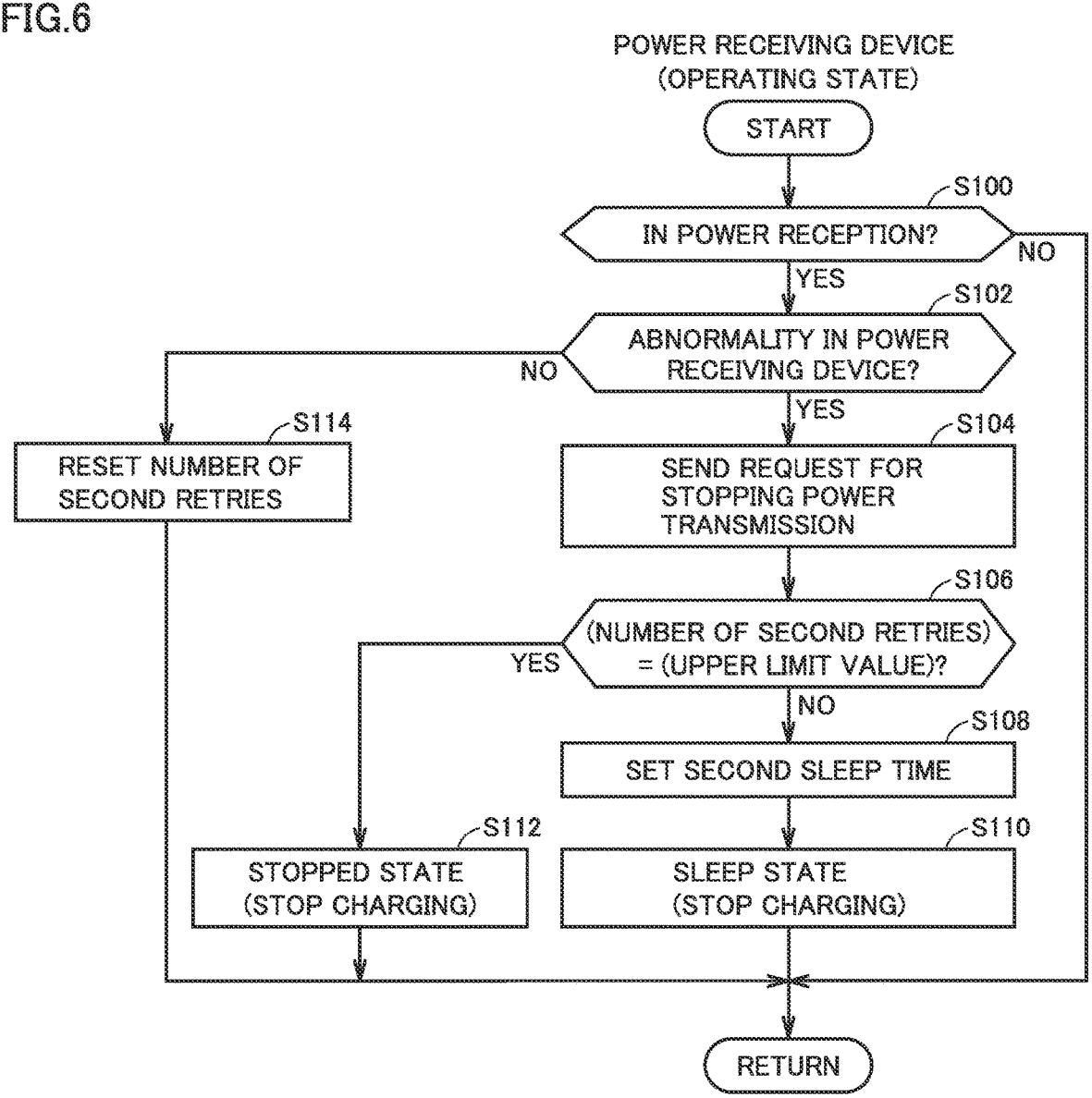
FIG. 6 is a flowchart (Part 2) showing an example procedure to be executed when the charging ECU of the power receiving device is in an operating state.

FIG. 6 is a flowchart showing an example procedure which charging ECU 360 of power receiving device 20 in Embodiment 2 executes when it is in an operating state. This flowchart is executed in addition to the one in FIG. 4 described in relation to Embodiment 1 above.

Charging. ECU 360 determines whether or not power reception is being performed (Step S100). When power reception is not being performed (NO at Step S100), charging ECU 360 skips the subsequent steps and goes on to the return.

When power reception is being performed (YES at Step S100), charging ECU 360 determines whether or not an abnormality (any of an overvoltage abnormality, an overcurrent abnormality, and an overheating abnormality) has occurred in power receiving device 20 (Step S102).

When an abnormality has not occurred in power receiving device 20 (NO at Step S102), charging ECU 360 resets the number of second retries (Step S114). The number of second retries refers to the number of times power transmission is stopped due to an abnormality in power receiving device 20 and then a retry request is sent to power transmitting device 10.

When an abnormality has occurred in power receiving device 20 (YES at Step S102), charging ECU 360 sends power transmitting device 10 a request for stopping power transmission (Step S104).

After sending a request for stopping power transmission, charging ECU 360 determines whether or not the number of second retries has reached an upper limit value (Step S106). Similarly to the number of first retries, the upper limit value of the number of second retries may be a predetermined fixed value or may be a value variable in accordance with the type of abnormality in power receiving device 20.

When the number of second retries has reached an upper limit value (YES at Step S106), charging ECU 360 stops charging and transitions to a stopped state (Step S112).

When the number of second retries has not reached an upper limit value (NO at Step S106), charging ECU 360 sets a second sleep time in accordance with the type of abnormality (an overvoltage abnormality, an overcurrent abnormality, or an overheating abnormality) in power receiving device 20 (Step S108).

Considering that an overcurrent abnormality and an overvoltage abnormality can be removed in a relatively short time, and considering that it takes a certain amount of time to remove an overheating abnormality (to lower the temperature), charging ECU 360 sets the second sleep time for overcurrent abnormality and overvoltage abnormality to a shorter time than for overheating abnormality, for example.

After setting the second sleep time, charging ECU 360 transitions to a sleep state (Step S110).

Figure 7:
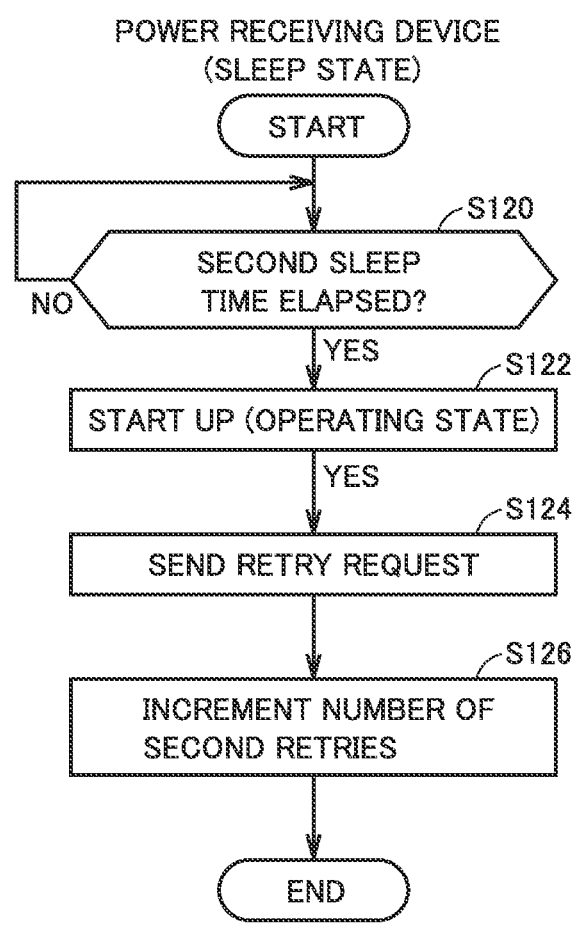
FIG. 7 is a flowchart (Part 2) showing an example procedure to be executed when the charging ECU of the power receiving device transitions to a sleep state.

FIG. 7 is a flowchart showing an example procedure which charging ECU 360 of power receiving device 20 in Embodiment 2 executes when it transitions to a sleep state. This flowchart is executed in addition to the one in FIG. 5 described in relation to Embodiment 1 above.

Charging ECU 360 determines whether or not a second sleep time has elapsed since the transition to a sleep state (Step S120). When a second sleep time has not elapsed (NO at Step S120), charging ECU 360 returns the process to Step S120 and maintains the sleep state until the second sleep time has elapsed.

When the second sleep time has elapsed (YES at Step S120), charging ECU 360 starts up and returns from the sleep state to the operating state (Step S122) and sends a retry request to power transmitting device 10 (Step S124). After sending the retry request, charging ECU 360 increments the number of second retries by one (Step S126).

Figure 8:
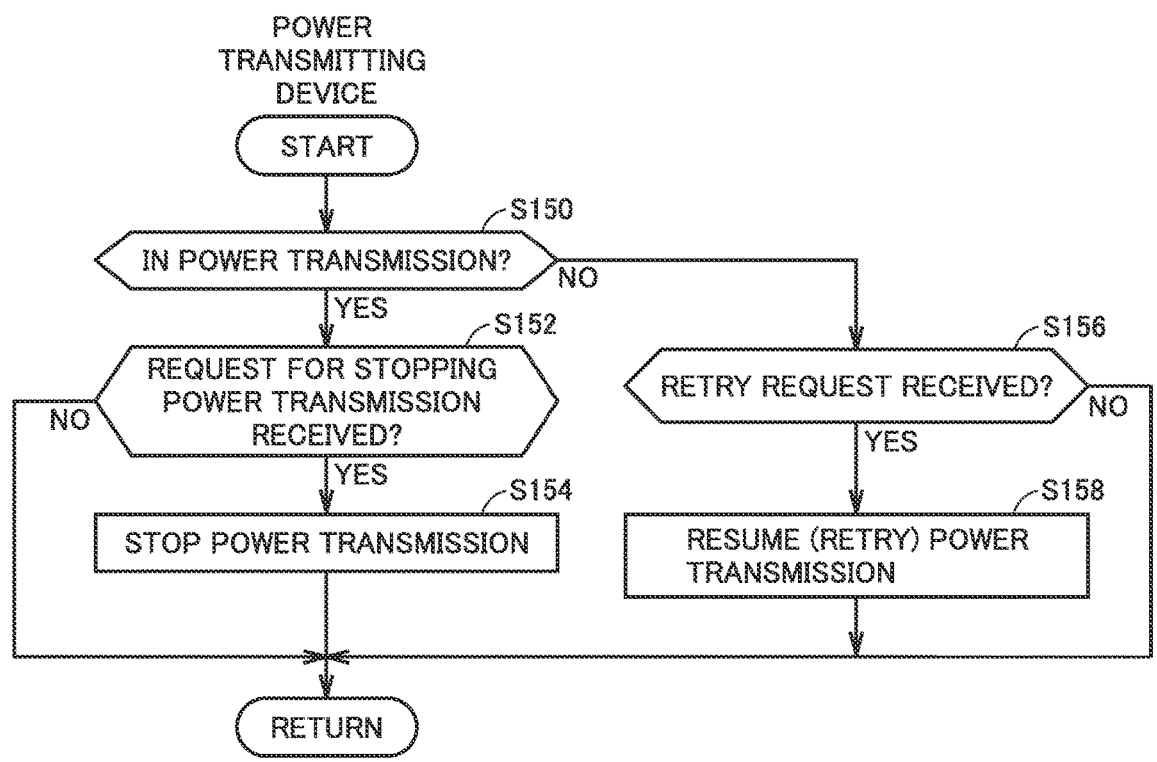
FIG. 8 is a flowchart (Part 2) showing an example procedure of the power supply ECU of the power transmitting device.

FIG. 8 is a flowchart showing an example procedure which power supply ECU 250 of power transmitting device 10 in Embodiment 2 executes when it stops power transmission due to an abnormality in power receiving device 20 and then resumes power transmission. This flowchart is executed in addition to the one in FIG. 3 described in relation to Embodiment 1 above.

Power supply ECU 250 determines whether or not power transmission to power receiving device 20 is being performed (Step S150). When power transmission is being performed (YES at Step S150), power supply ECU 250 determines whether or not a request for stopping power transmission has been received from power receiving device 20 (Step S152). When a request for stopping power transmission has not been received (NO at Step S152), power supply ECU 250 skips the subsequent steps and goes on to the return.

When a request for stopping power transmission has been received (YES at Step S152), power supply ECU 250 stops power transmission to power receiving device 20 (Step S154).

When power transmission is not being performed (NO at Step S150), power supply ECU 250 determines whether or not a retry request has been received from power receiving device 20 (Step S156). When a retry request has not been received (NO at Step S156), power supply ECU 250 skips the subsequent steps and goes on to the return.

When a retry request has been received (YES at Step S156), power supply ECU 250 resumes (retries) power transmission to power receiving device 20 (Step S158).

As described above, when power supply ECU 250 of power transmitting device 10 in Embodiment 2 stops power transmission in response to receiving from power receiving device 20 a request for stopping power transmission (in response to the occurrence of an abnormality in power receiving device 20), power supply ECU 250 resumes power transmission in response to receiving from power receiving device 20 a request for resuming power transmission as a trigger. For a period of time from the sending of a request for stopping power transmission to the sending of a request for resuming power transmission to power transmitting device 10 (second sleep time), charging ECU 360 of power receiving device 20 is in a sleep state instead of waiting in an operating state. Thus, when the power transmitting device stops power transmission due to an abnormality in power receiving device 20, too, power transmission can be resumed while power receiving device 20 consumes less power.

In particular, when an abnormality occurs in power receiving device 20 during power reception from power transmitting device 10, charging ECU 360 of power receiving device 20 in Embodiment 2 sets a second sleep time in accordance with the type of abnormality in power receiving device 20 before transitioning to a sleep state. Thus, a period of time from the stop of power transmission to the resumption of power transmission (second sleep time) can be varied in accordance with the type of abnormality in power receiving device 20.

Although embodiments of the present disclosure have been described, it should be construed that the embodiments disclosed herein are by way of illustration in every respect and are not to be taken by way of limitation. The scope of the present disclosure is defined by the terms of the claims and is intended to encompass any modification within the meaning and scope equivalent to the terms of the claims.

What is claimed is:
1. A wireless power transfer system comprising:
   a power transmitting device configured to wirelessly transmit power; and
   a power receiving device configured to wirelessly receive power from the power transmitting device and communicate with the power transmitting device, the power transmitting device being configured to, when an abnormality occurs in the power transmitting device during power transmission to the power receiving device, stop power transmission to the power receiving device, the power receiving device being configured to:
  when the power transmission is stopped due to the abnormality in the power transmitting device, transition to a sleep state; and
  when a first time has elapsed since the transition to the sleep state, send the power transmitting device a request for resuming power transmission, the power transmitting device being configured to, when receiving the request for resuming power transmission while the power transmission is stopped, resume the power transmission, the power transmitting device is configured to, when the abnormality occurs in the power transmitting device during power transmission to the power receiving device, stop the power transmission and notify the power receiving device of a type of abnormality in the power transmitting device, and the power receiving device is configured to, when the power transmission is stopped due to the abnormality in the power transmitting device, set the first time in accordance with the type of abnormality notified from the power transmitting device before transitioning to the sleep state.

2. The wireless power transfer system according to claim 1, wherein
  the power transmitting device is configured to, when receiving from the power receiving device a request for stopping power transmission during power transmission to the power receiving device, stop the power transmission, and
  the power receiving device is configured to:
    when the abnormality occurs in the power receiving device during power reception from the power transmitting device, send the power transmitting device the request for stopping power transmission and then transition to the sleep state; and
    when a second time has elapsed since the transition to the sleep state, send the power transmitting device the request for resuming power transmission.

3. The wireless power transfer system according to claim 2, wherein
  the power receiving device is configured to, when the abnormality occurs in the power receiving device during power reception from the power transmitting device, set the second time in accordance with a type of abnormality in the power receiving device before transitioning to the sleep state.

4. A wireless power transmitting device configured to wirelessly transmit power to a power receiving device, the power transmitting device comprising:
  a communication device configured to communicate with the power receiving device; and
  a controller configured to control power transmission to the power receiving device,
  the controller being configured to:
    when an abnormality occurs in the power transmitting device during power transmission to the power receiving device, stop power transmission to the power receiving device; and
    when receiving from the power receiving device a request for resuming power transmission while the power transmission is stopped, resume the power transmission,
  wherein the power transmitting device is configured to, when the abnormality occurs in the power transmitting device during power transmission to the power receiving device, stop the power transmission and notify the power receiving device of a type of abnormality in the power transmitting device, and
  wherein the power receiving device is configured to, when the power transmission is stopped due to the abnormality in the power transmitting device, set the first time in accordance with the type of abnormality notified from the power transmitting device before transitioning to the sleep state.

5. A wireless power receiving device configured to wirelessly receive power from a power transmitting device, the power receiving device comprising:
  a communication device configured to communicate with the power transmitting device; and
  a controller configured to control the communication device,
  the controller being configured to:
    when power transmission from the power transmitting device is stopped due to an abnormality in the power transmitting device, transition to a sleep state; and
    when a first time has elapsed since the transition to the sleep state, send the power transmitting device a request for resuming power transmission,
  wherein the power transmitting device is configured to, when the abnormality occurs in the power transmitting device during power transmission to the power receiving device, stop the power transmission and notify the power receiving device of a type of abnormality in the power transmitting device, and
  wherein the power receiving device is configured to, when the power transmission is stopped due to the abnormality in the power transmitting device, set the first time in accordance with the type of abnormality notified from the power transmitting device before transitioning to the sleep state.

* * * * *

UNITED STATES PATENT AND TRADEMARK OFFICE
CERTIFICATE OF CORRECTION

PATENT NO. : 10,916,970 B2
APPLICATION NO. : 16/146017
DATED : February 9, 2021
INVENTOR(S) : Takahiro Misawa Page 1 of 1

It is certified that error appears in the above-identified patent and that said Letters Patent is hereby corrected as shown below:

In the Specification

In Column 1, Line 10, delete "2017-1888660" and insert --2017-188660--, therefor.

In Column 5, Line 25, delete "largo" and insert --large--, therefor.

In Column 5, Line 48, delete "(FIG. 3)" and insert --(Fig. 1)--, therefor.

In Column 6, Line 60, delete "319" and insert --310--, therefor.

In Column 9, Line 38, after "repeatedly", delete "11" and insert --if,--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*